United States Patent
Li et al.

(10) Patent No.: US 11,184,875 B2
(45) Date of Patent: Nov. 23, 2021

(54) PAGING METHOD AND APPARATUS FOR WIRELESS COMMUNICATION

(71) Applicant: HUAWEI TECHNOLOGIES CO., LTD., Shenzhen (CN)

(72) Inventors: Yongcui Li, Beijing (CN); Yan Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/571,308

(22) Filed: Sep. 16, 2019

(65) Prior Publication Data

US 2020/0015194 A1 Jan. 9, 2020
US 2021/0235414 A2 Jul. 29, 2021

Related U.S. Application Data

(63) Continuation of application No. PCT/CN2017/077553, filed on Mar. 21, 2017.

(51) Int. Cl.
*H04W 68/02* (2009.01)
*H04W 76/12* (2018.01)
(Continued)

(52) U.S. Cl.
CPC .......... *H04W 68/02* (2013.01); *H04W 48/16* (2013.01); *H04W 52/0235* (2013.01);
(Continued)

(58) Field of Classification Search
CPC ..... H04W 68/02; H04W 76/12; H04W 76/11; H04W 52/0235; H04W 76/30; H04W 76/27; H04W 48/16
See application file for complete search history.

(56) References Cited

U.S. PATENT DOCUMENTS

2015/0201400 A1 7/2015 Yin et al.
2017/0208567 A1 7/2017 Li
(Continued)

FOREIGN PATENT DOCUMENTS

CN 101998670 A 3/2011
CN 102164411 A 8/2011
(Continued)

OTHER PUBLICATIONS

3GPP TS 23.401 V14.3.0 (Mar. 1, 2017);3rd Generation Partnership Project;Technical Specification Group Services and System Aspects;General Packet Radio Service (GPRS) enhancements for Evolved Universal Terrestrial Radio Access Network (E-UTRAN) access(Release 14);total 386 pages.
(Continued)

*Primary Examiner* — Diane D Mizrahi
(74) *Attorney, Agent, or Firm* — Rimon PC

(57) ABSTRACT

A paging method and apparatus are provided to simplify a prior-art paging process. The method includes: receiving, by an access device, downlink data, where the downlink data includes a first identifier of a terminal; determining a paging identifier based on the first identifier; and sending, by the access device, a paging message to the terminal, where the paging message carries the paging identifier. After the access device receives the downlink data, the access device can initiate the paging process without using a control plane network element device. The advantages of the innovative paging methods disclosed herein include reduced signaling, shortened signaling transmission, and simplified paging process.

11 Claims, 10 Drawing Sheets

(51) Int. Cl.
*H04W 76/11* (2018.01)
*H04W 48/16* (2009.01)
*H04W 52/02* (2009.01)
*H04W 76/30* (2018.01)
*H04W 76/27* (2018.01)

(52) U.S. Cl.
CPC ............ *H04W 76/11* (2018.02); *H04W 76/12* (2018.02); *H04W 76/27* (2018.02); *H04W 76/30* (2018.02)

(56) References Cited

U.S. PATENT DOCUMENTS

| | | | |
|---|---|---|---|
| 2018/0070237 A1* | 3/2018 | Cho | H04W 12/1006 |
| 2018/0115928 A1* | 4/2018 | Kim | H04W 36/0033 |
| 2020/0021859 A1* | 1/2020 | Lin | H04N 21/6405 |

FOREIGN PATENT DOCUMENTS

| | | |
|---|---|---|
| CN | 104144467 A | 11/2014 |
| CN | 106162877 A | 11/2016 |
| EP | 2892289 A1 | 7/2015 |
| WO | 2010062095 A2 | 6/2010 |
| WO | 2011023090 A1 | 3/2011 |
| WO | 2014047825 A1 | 4/2014 |
| WO | 2016049902 A1 | 4/2016 |
| WO | 2016162051 A1 | 10/2016 |

OTHER PUBLICATIONS

3GPP TS 36.413 V14.1.0 (Jan. 1, 2017);3rd Generation Partnership Project;Technical Specification Group Radio Access Network;Evolved Universal Terrestrial Radio Access Network(E-UTRAN);S1 Application Protocol (S1AP) (Release 14);total 333 pages.

* cited by examiner

PAGING METHOD AND APPARATUS FOR WIRELESS COMMUNICATION

CROSS-REFERENCE TO RELATED APPLICATIONS

This application is a continuation of International Application No. PCT/CN2017/077553, filed on Mar. 21, 2017, the disclosure of which is hereby incorporated by reference in its entirety.

TECHNICAL FIELD

This application relates to the field of communications technologies, and in particular, to a paging method and apparatus.

BACKGROUND

With development of wireless network technologies, Internet of Things (IoT) applications become more popular. To save power, if a terminal does not interact with a network side for a long time, the terminal enters an idle state, and releases a connection between the terminal and a core network. When downlink data arrives, the connection between the terminal and the core network needs to be reestablished first, so that the terminal enters an active state. This process is a paging process.

FIG. 1 shows a paging process in a 4G network.

S101. A serving gateway (S-GW) receives downlink data.

S102. The S-GW sends a downlink data notification (DDN) message to a mobility management entity (MME).

S103. The MME returns a downlink data notification acknowledgment message to the S-GW.

S104. The MME sends a paging message to an evolved NodeB (eNB).

S105. The eNB sends the paging message to user equipment (UE).

After receiving the paging message, the UE re-establishes an air interface connection between the UE and the eNB and a signaling connection between the eNB and the MME.

It may be learned from FIG. 1 that in the 4G network, when the UE is in an idle state, only an S11 signaling connection between the MME and the S-GW and a user plane connection (not shown in FIG. 1) between the S-GW and a packet data network gateway (P-GW) exist. An Si connection between the eNB and the MME is in a disconnected state, and a radio resource control (RRC) connection between the UE and the eNB is also in a disconnected state.

The foregoing paging process mainly has the following problems: An amount of exchanged signaling is relatively large, and the paging process is relatively complex.

SUMMARY

Embodiments of this application provide a paging method and apparatus, to resolve a prior-art problem that a paging process is complex.

According to a first aspect, an embodiment of this application provides a paging method, including: receiving, by an access device, downlink data, where the downlink data includes a first identifier of a terminal; determining a paging identifier based on the first identifier; and sending, by the access device, a paging message to the terminal, where the paging message carries the paging identifier. Therefore, according to the method provided in this embodiment of this application, after the access device receives the downlink data, the paging process is initiated by the access device, and there is no need to use a control plane network element device, so that signaling is saved, a signaling transmission path is shortened, and complexity of the paging process is reduced.

In a possible design, the determining, by the access device, a paging identifier based on the first identifier includes: determining, by the access device, the first identifier as the paging identifier. Therefore, the paging identifier is determined by using the method provided in this embodiment of this application, the method is simple, and complexity is relatively low. It should be understood that, because one terminal may be corresponding to a plurality of IP addresses, when the paging identifier is an IP address of the terminal or a derived value of an IP address of the terminal, the access device can only reestablish a session connection corresponding to the IP address, but cannot reestablish all session connections corresponding to the terminal. When the paging identifier is an ID of the terminal, or a derived value of an ID of the terminal, or a MAC address of the terminal, or a derived value of a MAC address of the terminal, the access device can reestablish all session connections of the terminal.

In a possible design, the determining, by the access device, a paging identifier based on the first identifier includes: determining, by the access device, a second identifier of the terminal based on the first identifier, where the paging identifier includes the second identifier of the terminal. Therefore, according to the method provided in this embodiment of this application, the second identifier may be a temporary identifier and is the same as a paging identifier in the prior art, the terminal does not need to be upgraded, and there is good compatibility with the prior art. For example, the access device stores an algorithm, and the access device may map the first identifier to the second identifier according to the algorithm. Optionally, the access device itself may not need to store a mapping relationship between the first identifier and the second identifier. In addition, a Control Plane (CP) also stores the same algorithm as the access device. The CP may also map the first identifier to the second identifier according to the algorithm. The CP notifies the terminal of the second identifier in advance, so that when receiving the paging message that carries the second identifier and that is sent by the access device, the terminal learns that the paging message is a paging message for the terminal.

In a possible design, the method further includes: determining, by the access device based on a target tunnel identifier and a correspondence between a tunnel identifier and a device identifier of a control plane network element, a device identifier that is of a control plane network element and that corresponds to the target tunnel identifier, where the target tunnel identifier is a tunnel identifier of a tunnel used by the access device to receive downlink data, and where the paging identifier further includes the device identifier that is of the control plane network element and that corresponds to the target tunnel identifier. Therefore, according to the method provided in this embodiment of this application, after determining the second identifier of the terminal, the access device may further determine the device identifier that is of the control plane network element and that corresponds to the target tunnel identifier, and use the second identifier and the device identifier as the paging identifier. In this case, the terminal does not need to be upgraded, and there is good compatibility with the prior art.

In a possible design, the determining, by the access device, a second identifier of the terminal based on the first identifier includes: determining, by the access device, based on the target tunnel identifier and a correspondence between a tunnel identifier and a data network (DN) name, a DN name corresponding to the target tunnel identifier, where the target tunnel identifier is a tunnel identifier of a tunnel used by the access device to receive the downlink data; and determining, by the access device, the second identifier of the terminal based on the first identifier and the DN name corresponding to the target tunnel identifier. Therefore, depending on different scenarios, the second identifier may be further determined based on different parameters, thereby ensuring reliability and accuracy of the paging identifier.

In a possible design, the first identifier is an identity (ID) of the terminal, or a derived value of an ID of the terminal, or an IP address of the terminal, or a derived value of an IP address of the terminal, or a media access control MAC address of the terminal, or a derived value of a MAC address of the terminal. Therefore, this embodiment of this application provides a plurality of possible implementations of the first identifier, thereby improving flexibility of the first identifier.

In a possible design, the method further includes: determining, by the access device based on the target tunnel identifier and a correspondence between a tunnel identifier and a data network (DN) name, a DN name corresponding to the target tunnel identifier, where the target tunnel identifier is a tunnel identifier of a tunnel used by the access device to receive the downlink data, and the paging identifier further includes the DN name corresponding to the target tunnel identifier. Therefore, in a different scenario, the paging identifier may further include the DN name, thereby ensuring reliability and accuracy of the paging identifier. It should be noted that terminals accessing different DNs may have the same IP address. For example, UE 1 accesses a DN 1 by using an AN, and UE 2 accesses a DN 2 by using the same AN. Therefore, an IP address of the UE 1 may be the same as an IP address of the UE 2. In this scenario, when the paging identifier is an IP address of the UE or a derived value of an IP address of the UE, or when the paging identifier is the second identifier determined based on an IP address of the UE or a derived value of an IP address of the UE, or when the paging identifier is the device identifier of the control plane network element and the second identifier that is determined based on an IP address of the UE or a derived value of an IP address of the UE, the UE cannot be uniquely determined. Therefore, the first identifier and the DN name are considered as the paging identifier; or the second identifier and the DN name are used as the paging identifier; or the second identifier and the device identifier of the control plane network element and the DN name are used as the paging identifier; or the AN determines the second identifier based on the first identifier and the DN name, and uses the second identifier as the paging identifier; or the AN determines the second identifier based on the first identifier and the DN name, and uses the second identifier and the device identifier of the control plane network element as the paging identifier. Similarly, the DN name may be replaced with a derived value of the DN name, and the first identifier may be replaced with a derived value of the first identifier.

In a possible design, the method further includes: receiving, by the access device, the correspondence between a tunnel identifier and a DN name from the control plane network element in a tunnel establishment process. Therefore, in this embodiment of this application, the access device may receive the correspondence between a tunnel identifier and a DN name from the control plane network element in the user plane tunnel establishment process. Specifically, a user plane tunnel may be established in a process of establishing a device connection or in a process of establishing a session initiated by the terminal.

In a possible design, the sending, by the access device, a paging message includes: calculating, by the access device, a paging occasion based on the paging identifier; and sending, by the access device, the paging message on the paging occasion. Therefore, in this embodiment of this application, the access device may calculate the paging occasion by using the paging identifier, for example, the first identifier or the second identifier, and does not need to receive, from the control plane network element, a parameter used to calculate the paging occasion, thereby saving signaling.

According to a second aspect, a paging method is provided, including: receiving, by an access device, downlink data; determining, by the access device based on a target tunnel identifier and a correspondence between a tunnel identifier and a group identifier, a group identifier corresponding to the target tunnel identifier, where the target tunnel identifier is a tunnel identifier of a tunnel used by the access device to receive the downlink data; and sending, by the access device, a paging message to a terminal in a group corresponding to the group identifier, where the paging message carries a paging identifier, and the paging identifier includes the group identifier corresponding to the target tunnel identifier. Therefore, according to the method provided in this embodiment of this application, the access device successfully pages, by determining the group identifier, the terminal included in the group, and does not need to perform signaling interaction for a plurality of times by using a plurality of network elements, thereby improving paging efficiency.

In a possible design, the method further includes: receiving, by the access device, the correspondence between a tunnel identifier and a group identifier from a control plane network element in a tunnel establishment process. Therefore, the access device can obtain the correspondence between a tunnel identifier and a group identifier in a user plane tunnel establishment process without adding a new signaling interaction procedure and without increasing system complexity.

In a possible design, the method further includes: receiving, by the access device, a quantity of terminals included in the group corresponding to the group identifier from the control plane network element in the tunnel establishment process; and the sending, by the access device, a paging message to a terminal corresponding to the group identifier includes: periodically sending, by the access device, the paging message to the terminal corresponding to the group identifier until the access device determines that all terminals corresponding to the group identifier are successfully paged. Therefore, according to the method provided in this embodiment of this application, the access device can clearly understand whether all terminals in the group are successfully paged, thereby ensuring consistency of the terminals in the group, and improving reliability of the paging process.

In a possible design, the paging message further carries the downlink data. Therefore, compared with the prior art in which data is transmitted through a broadcast channel, the method in this application enhances reliability of downlink data transmission.

In a possible design, after the sending, by the access device, a paging message, the method further includes: sending, by the access device, the downlink data to a first terminal in the group corresponding to the group identifier when determining that the first terminal enters an active state. Therefore, compared with the prior art in which data is transmitted through a broadcast channel, the method in this application enhances reliability of downlink data transmission.

According to a third aspect, this application provides a paging apparatus, configured to perform the method according to any one of the first aspect or the possible designs of the first aspect. Specifically, the apparatus includes units configured to perform the method according to any one of the first aspect or the possible designs of the first aspect.

According to a fourth aspect, this application provides a paging apparatus, configured to perform the method according to any one of the second aspect or the possible designs of the second aspect. Specifically, the apparatus includes units configured to perform the method according to any one of the second aspect or the possible designs of the second aspect.

According to a fifth aspect, this application provides an access device, including a transceiver, a processor, and a memory. The transceiver, the processor, and the memory may be connected by using a bus system. The memory is configured to store a program, an instruction, or code. The processor is configured to execute the program, the instruction, or the code in the memory, to perform the method according to any one of the first aspect or the possible implementations of the first aspect.

According to a sixth aspect, this application provides an access device, including a transceiver, a processor, and a memory. The transceiver, the processor, and the memory may be connected by using a bus system. The memory is configured to store a program, an instruction, or code. The processor is configured to execute the program, the instruction, or the code in the memory, to perform the method according to any one of the second aspect or the possible implementations of the second aspect.

According to still another aspect of this application, a computer readable storage medium is provided. The computer readable storage medium stores an instruction. When the instruction runs on a computer, the computer performs the methods in the foregoing aspects.

According to still another aspect of this application, a computer program product that includes an instruction is provided, when the instruction runs on a computer, the computer performs the method in the foregoing aspects.

According to the solution of this application, the access device receives the downlink data, where the downlink data includes the first identifier of the terminal, and the access device determines the paging identifier based on the first identifier, and sends the paging message to the terminal, where the paging message carries the paging identifier. Therefore, after the access device receives the downlink data, the paging process is initiated by the access device, and there is no need to use a control plane network element device, so that signaling is saved, a signaling transmission path is shortened, and complexity of the paging process is reduced.

According to the solution of this application, the access device receives the downlink data, and determines, based on the target tunnel identifier and the correspondence between a tunnel identifier and a group identifier, the group identifier corresponding to the target tunnel identifier, where the target tunnel identifier is the tunnel identifier of the tunnel used by the access device to receive the downlink data; and sends the paging message to the terminal in the group corresponding to the group identifier, where the paging message carries the paging identifier, and the paging identifier includes the group identifier corresponding to the target tunnel identifier. Therefore, the access device determines the group identifier based on the tunnel identifier of the tunnel used to receive the downlink data, successfully pages the terminal included in the group, and does not need to perform signaling interaction for a plurality of times by using a plurality of network elements, thereby improving paging efficiency.

DESCRIPTION OF EMBODIMENTS

The following describes the embodiments of this application with reference to accompanying drawings.

Figure 1:
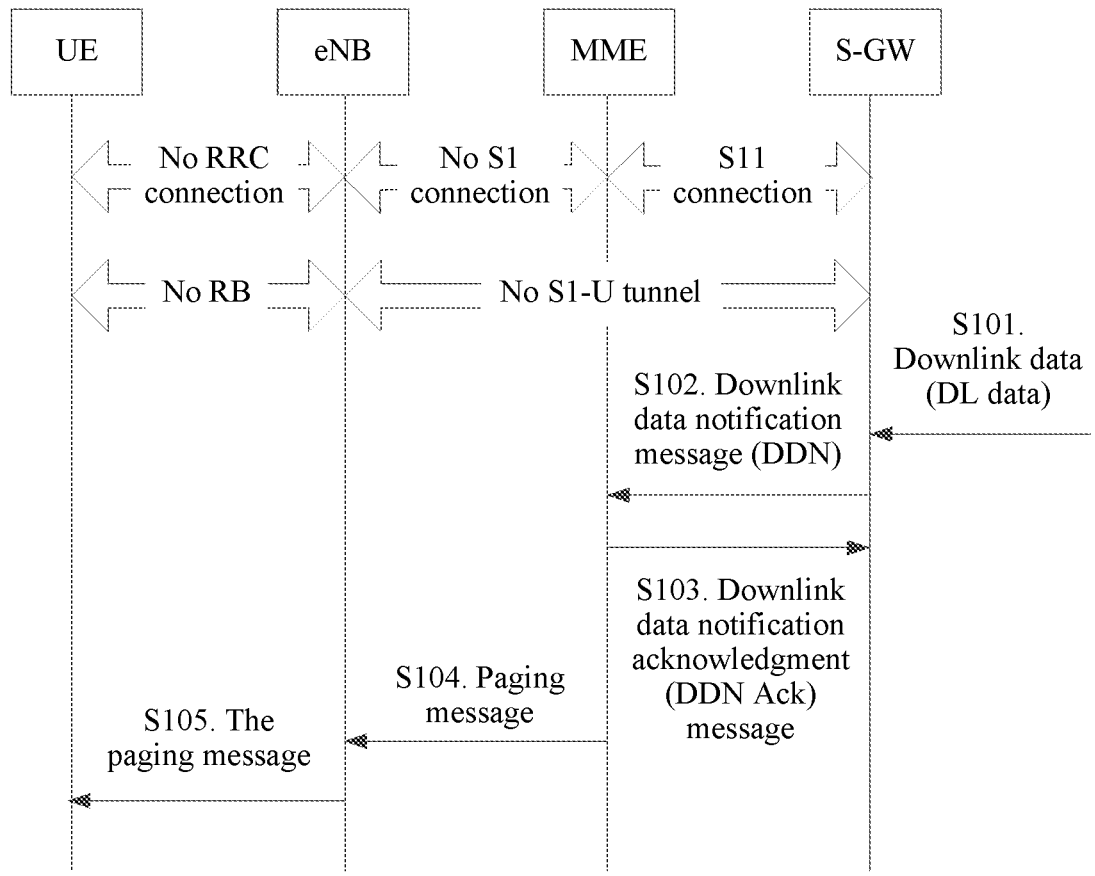
FIG. 1 is a schematic diagram of a paging procedure in a 4G network in the background of this application.
Figure 2:
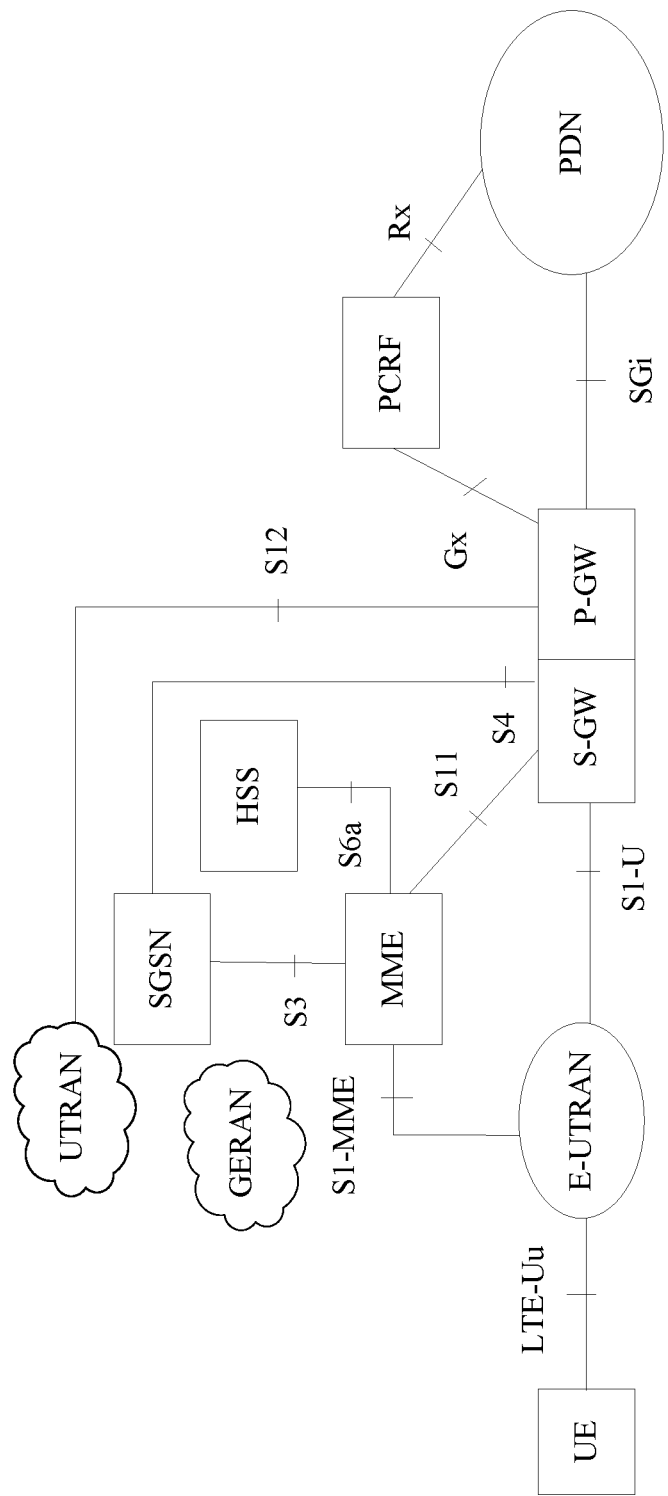
FIG. 2 is a schematic structural diagram of an evolved packet system according to an embodiment of this application.
Figure 3:
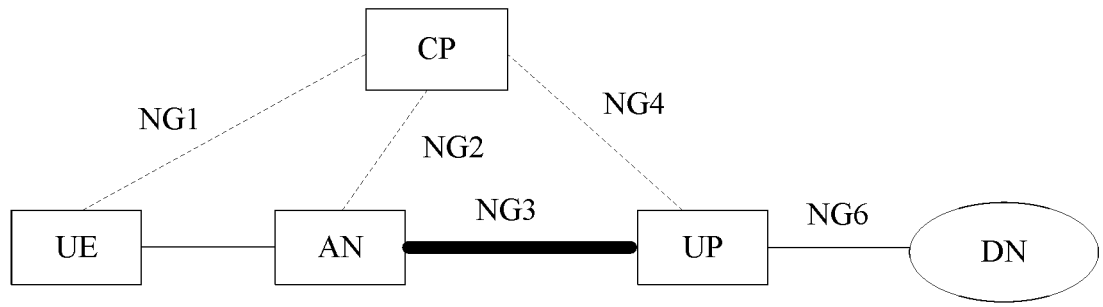
FIG. 3 is a schematic diagram of an SDN-based network architecture according to an embodiment of this application.

First, application scenarios of the embodiments of this application are briefly described. Refer to FIG. 2 and FIG. 3.

As shown in FIG. 2, an evolved packet system (EPS) includes two parts: a radio access network and a core network. The radio access network is an evolved universal terrestrial radio access network (E-UTRAN), and is used to implement functions related to radio access. The core network is an evolved packet core (EPC) network. Key logical network elements in the core network include an MME, an S-GW, a P-GW, a home subscriber server (HSS), a policy and charging rules function (PCRF) unit, and the like.

The MME is mainly responsible for mobility management and session management of a control plane, such as user authentication, a handover, mobility management of a terminal in an idle state, and user context management and bearer management. The S-GW is a user plane function entity, implements routing and forwarding of packet data, is also used as a data anchor in a 3GPP system, and terminates an interface towards the E-UTRAN. The HSS stores subscription information of a user. The P-GW is a gateway connected to an external data network, and is a user plane anchor between a 3GPP access network and a non-3GPP access network.

For example, UE may access an external packet data network (PDN) by establishing a PDN connection to the P-GW. The PDN may be the Internet, a virtual private network (VPN), an IP multimedia service (IMS) network, a wireless application protocol (WAP) network provided by an operator, or the like.

In an actual network deployment, the S-GW and the P-GW are integrated for deployment (except a few cases, such as roaming), and are generally referred to as a gateway. With development of mobile Internet services, diversification of enterprise network services, and convergence of mobile access networks in a plurality of standards, it is necessary for a gateway device to gradually develop towards a more refined service control and charging direction on the basis of implementing basic data forwarding functions, thereby supporting richer service implementation and control of operators. Therefore, in the EPS architecture, the gateway still retains a large quantity of external signaling interfaces. To process a large quantity of interface signaling, the gateway uses a dedicated hardware platform and a lot of hardware such as a general purpose computing processor chip is added on the basis of the dedicated hardware platform. As a result, a hardware platform of the gateway device is very complicated, and costs are excessively high, which is not conducive to popularizing and deploying a mobile packet data network; and in addition, signaling processing performance is poor, and this has become a bottleneck of network evolution.

A software-defined networking (SDN) technology provides an effective solution for the bottleneck of network evolution. A control plane interface signaling processing function of the gateway and a user plane data forwarding function of the gateway are further separated, the interface signaling processing function is placed on a general computing platform to form a control plane (CP) network element, and the user plane data forwarding function is placed on a dedicated hardware platform to form a forwarding plane (UP) network element. In addition, a control plane function and a forwarding plane function in the gateway are decoupled, design of the hardware platform is greatly simplified, costs of the hardware platform are reduced, and deployment of the mobile packet data network is accelerated.

As shown in FIG. 3, FIG. 3 is a schematic diagram of an SDN-based network architecture, including a CP, a UP, an access network (AN), a terminal, a data network (DN), and the like. When the terminal is in an active state, an NG1 signaling connection exists between the CP and the terminal; a wireless connection exists between the terminal and the AN, where the wireless connection includes an RRC signaling connection and a user plane connection, and the user plane connection may be a radio bearer (RB); an NG2 connection exists between the CP and the AN; an NG3 connection exists between the AN and the UP; an NG4 connection exists between the CP and the UP; and an NG6 connection exists between the UP and the DN.

The CP is responsible for mobility management and forwarding path management in the SDN network, for example, delivering a packet forwarding policy to the UP to instruct the UP to perform packet processing and forwarding according to the packet forwarding policy. The CP may be an SDN controller, or a gateway control plane (GW-C), or an MME, or formed through integration of the foregoing network elements. In addition, CPs may further be classified into a mobility management network element and a session management network element. The mobility management network element is responsible for performing mobility management of a user, such as attaching, handover, and location update. The session management network element is responsible for performing session management of the user, such as session establishment, session modification, and session release.

The UP is responsible for packet processing and forwarding, and may be a physical or virtual forwarding device, router, switch, or the like that has a forwarding plane function of the P-GW or a forwarding plane function of the S-GW.

The AN provides a radio access service for the terminal. The AN may include various base stations such as a macro base station, a micro base station (also referred to as a small cell), a relay station, and an access point. In systems that use different radio access technologies, a device with a base station function may have different names. For example, in an LTE system, the device is referred to as an eNodeB, and in a third generation (3G) system, the device is referred to as a NodeB.

The terminal includes but is not limited to a mobile phone, a network access terminal device, an Internet of Things terminal device, and the like.

The DN, which provides a data transmission service for the user, may be a PDN network, such as the Internet or an IMS.

It should be understood that, in a main application scenario of this application, the terminal is mainly a fixed wireless terminal, or a mobile terminal that moves within a coverage area of a base station, such as a fire detection sensor, a smart water meter/electricity meter, or a factory monitoring device. An aggregation tunnel such as a per group tunnel or a per node per DN tunnel is used between core networks, that is, between the AN and the UP, or between UPs. The per group tunnel may be used by a group of terminals. The per node per DN tunnel belongs to a device-level tunnel. For example, in an application scenario in which the per node per DN tunnel is used between the AN and the UP, all terminals that access a network by using the same AN and the same UP can use the same per node per DN tunnel, and the per node per DN tunnel is not released as the terminal enters an idle state, in other words, the user plane connection always exists between the AN and the UP.

An embodiment of this application provides a paging method, to resolve a prior-art problem that a paging process is complex and an amount of exchanged signaling is relatively large. For a scenario in which an access device pages a single terminal, as shown in FIG. 4, there is no RRC connection and no RB between the terminal and the access device; there is no NG2 connection between a control plane network element and the access device; there is an NG4 connection between the control plane network element and a forwarding plane network element; and there is an NG3 tunnel connection (for example, the foregoing per node per DN tunnel) between the access device and the forwarding plane network element.

Figure 4:
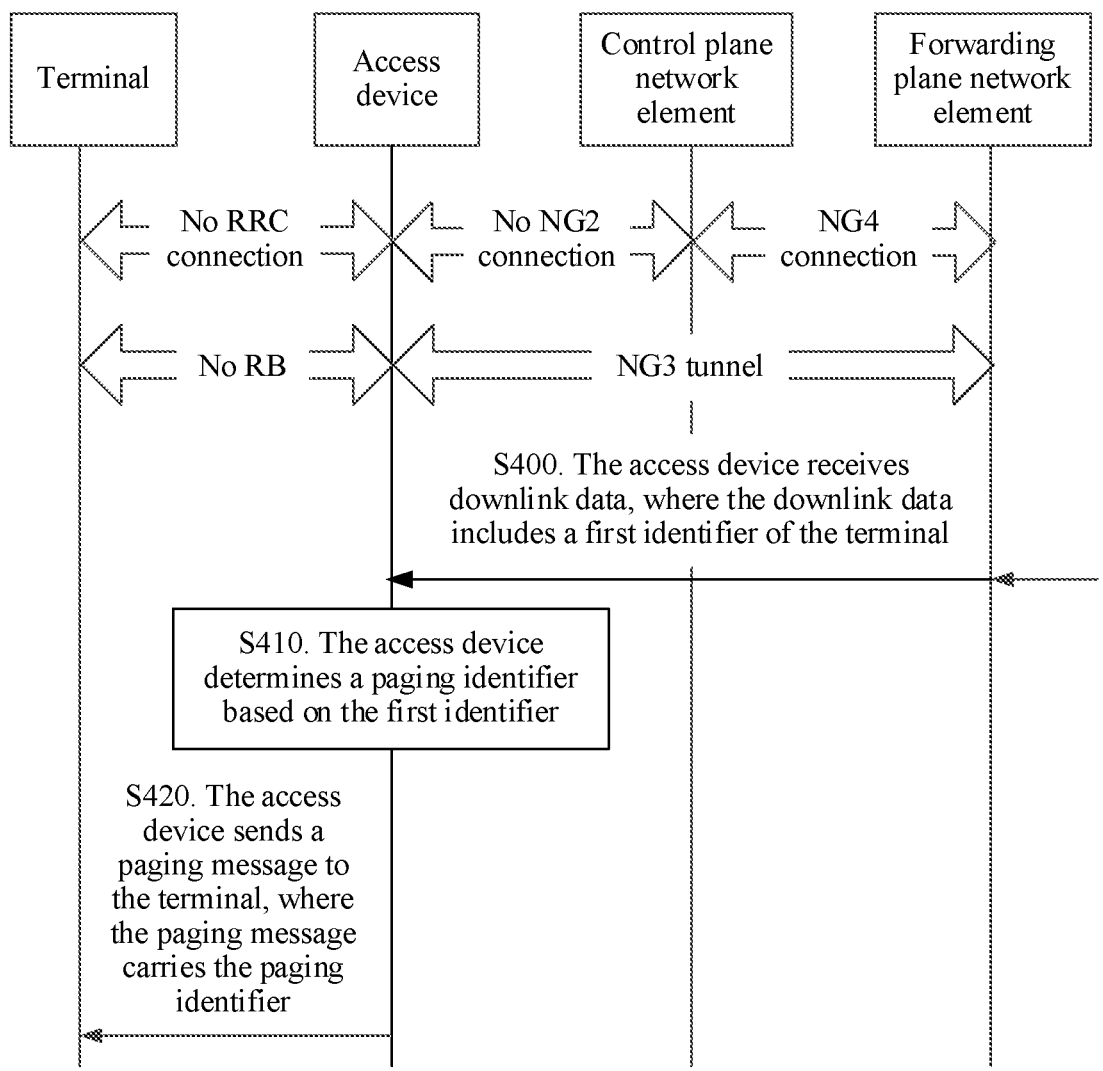
FIG. 4 is a first overview flowchart of a paging method according to an embodiment of this application.

Referring to FIG. 4, the method includes the following steps.

Step 400: An access device receives downlink data, where the downlink data includes a first identifier of a terminal.

As shown in FIG. 4, the aggregation tunnel, namely the NG3 tunnel, always maintains a connected state after being established. The access device receives, by using the aggregation tunnel, the downlink data sent by the forwarding plane network element.

Step 410: The access device determines a paging identifier based on the first identifier.

Step 420: The access device sends a paging message to the terminal, where the paging message carries the paging identifier.

It should be understood that when the terminal is not in an idle state, the access device may directly send the downlink data to the terminal by using an air interface connection between the terminal and the access device. When the terminal is in the idle state, the access device does not have an air interface side-context of the terminal, for example, a data radio bearer identity (DRB ID), and the access device needs to initiate paging to the terminal. After the terminal is switched to an active state, the access device sends the downlink data to the terminal.

It can be learned from the foregoing that, according to the method provided in this embodiment of this application, after receiving the downlink data, the access device does not need to perform signaling interaction for a plurality of times by using a plurality of network elements, thereby improving paging efficiency and reducing complexity of the paging process.

In a possible design, when the access device performs step 410, the access device determines the first identifier as the paging identifier.

For example, the first identifier is an identity (ID) of the terminal, or a derived value of the ID of the terminal, or an IP address of the terminal, or a derived value of the IP address of the terminal, or a media access control (MAC) address of the terminal, or a derived value of the MAC address of the terminal.

It should be understood that, because one terminal may be corresponding to a plurality of IP addresses, when the paging identifier is the IP address of the terminal or the derived value of the IP address of the terminal, the access device can only reestablish a session connection corresponding to the IP address, but cannot reestablish all session connections corresponding to the terminal. When the paging identifier is the ID of the terminal, or the derived value of the ID of the terminal, or the MAC address of the terminal, or the derived value of the MAC address of the terminal, the access device can reestablish all session connections of the terminal.

In a possible design, when the access device performs step 410, the access device determines a second identifier of the terminal based on the first identifier, where the paging identifier includes the second identifier of the terminal.

For example, the AN stores an algorithm, and the AN may map the first identifier to the second identifier according to the algorithm. Optionally, the AN itself may not need to store a mapping relationship between the first identifier and the second identifier. In addition, a CP also stores the same algorithm as the AN. The CP may also map the first identifier to the second identifier according to the algorithm. The CP notifies the terminal of the second identifier in advance, so that when receiving a paging message that carries the second identifier and that is sent by the AN, the terminal learns that the paging message is a paging message for the terminal.

In a possible design, when performing step 410, the access device may further determine, based on a target tunnel identifier and a correspondence between a tunnel identifier and a device identifier of a control plane network element, a device identifier that is of a control plane network element and that corresponds to the target tunnel identifier, where the target tunnel identifier is a tunnel identifier of a tunnel used by the access device to receive the downlink data. In this case, the paging identifier further includes the device identifier that is of the control plane network element and that corresponds to the target tunnel identifier. Therefore, the paging identifier includes the second identifier of the terminal and the device identifier that is of the control plane network element and that corresponds to the target tunnel identifier.

For example, the AN stores an algorithm, and the AN may map the first identifier to the second identifier according to the algorithm. Optionally, the AN itself may not need to store a mapping relationship between the first identifier and the second identifier. In addition, a CP also stores the same algorithm as the AN. The CP may also map the first identifier to the second identifier according to the algorithm. The CP notifies the terminal of the second identifier and a device identifier of the CP in advance, so that when receiving a paging message that carries the second identifier and the device identifier of the CP and that is sent by the AN, the terminal learns that the paging message is a paging message for the terminal.

For another example, when the first identifier is a UE IP address, the CP may allocate a temporary identifier to the UE based on the UE IP address, where the temporary identifier is used as the second identifier.

It should be noted that the CP may allocate the second identifier and the UE IP address at different times. For example, in a registration procedure or a session establishment procedure, the CP allocates the second identifier to the UE but does not allocate the UE IP address or a UE ID. After the session establishment procedure, the CP allocates the IP address to the UE, for example, in a dynamic host configuration protocol (DHCP) manner. In this case, the CP allocates a default or random second identifier to the UE in the registration procedure or the session establishment procedure. After the CP allocates the IP address to the UE, the CP updates the second identifier based on the UE IP, and sends the updated second identifier to the UE.

In addition, when the access device determines the second identifier of the terminal based on the first identifier of the terminal, the access device first determines, based on the target tunnel identifier and a correspondence between a tunnel identifier and a DN name, a DN name corresponding to the target tunnel identifier, and then the access device determines the second identifier of the terminal based on the first identifier of the terminal included in the downlink data and the DN name corresponding to the target tunnel identifier.

For example, the AN stores an algorithm, and the AN may map, according to the algorithm, the first identifier and the DN name corresponding to the target tunnel identifier to the second identifier. Optionally, the AN itself may not need to store a mapping relationship between the first identifier and the second identifier. For example, when the second identifier is a globally unique temporary identity (GUTI), the second identifier may be determined by using an algorithm: GUTI=f(UE IP, DNN). The DNN refers to a data network name (DNN).

Figure 5:
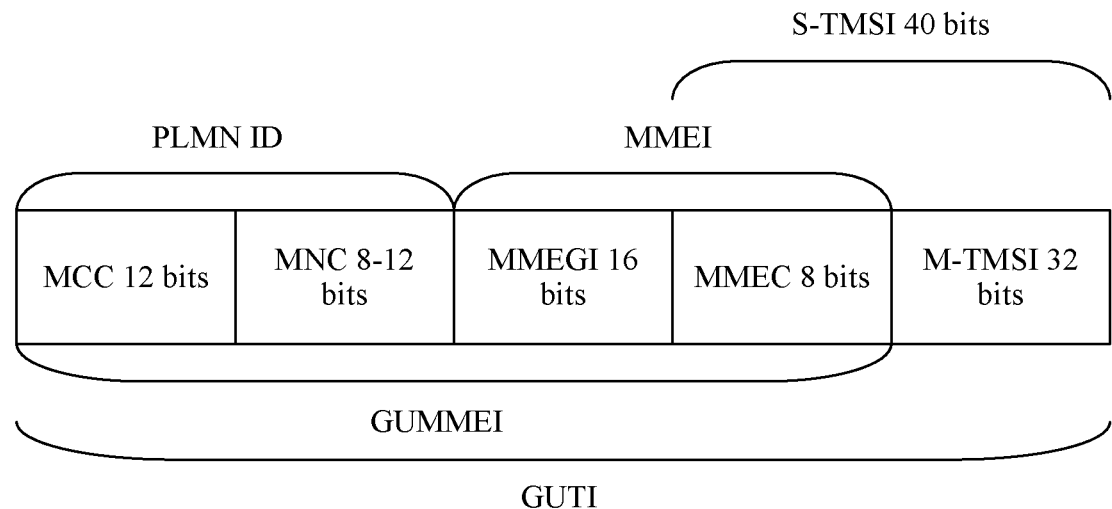
FIG. 5 is a schematic diagram of a composition of a GUTI according to an embodiment of this application.

A composition of the GUTI is shown in FIG. 5. In a 4G network, a mobile country code (MCC), a mobile network code (MNC), an MME group identifier (MMEGI), and an MME code (MMEC) cannot be changed. Only an MME-temporary mobile subscriber identity (M-TMSI) is randomly allocated by the CP.

According to this embodiment of this application, the AN may determine the GUTI, an SAE-temporary mobile subscriber identity (S-TMSI), or the M-TMSI of the UE as the second identifier based on the UE IP address or the UE ID. For example, the following manners may be used, but constitute no limitation:

$$GUTI = f(UE\ IP/UE\ ID) \qquad \text{Formula 1:}$$

$$S\text{-}TMSI = f(UE\ IP/UE\ ID) \qquad \text{Formula 2:}$$

$$M\text{-}TMSI = f(UE\ IP/UE\ ID) \qquad \text{Formula 3:}$$

Further, the CP allocates the GUTI to the UE based on the UE IP/UE ID by using Formula 1, and notifies the UE. Similarly, the AN determines the GUTI as the paging identifier based on the UE IP/ID included in the downlink data and Formula 1.

Alternatively, the CP allocates the S-TMSI to the UE based on the UE IP/UE ID by using Formula 2, and notifies the UE. Similarly, the AN determines the S-TMSI as the paging identifier based on the UE IP/ID included in the downlink data and Formula 2.

Alternatively, the CP allocates the M-TMSI to the UE based on the UE IP/UE ID by using Formula 3, and further determines the MMEC. The M-TMSI and the MMEC form the S-TMSI, and the CP notifies the UE of the S-TMSI. Similarly, the AN determines the corresponding M-TMSI based on the UE IP/ID included in the downlink data and Formula 3, and determines the corresponding MMEC based on the tunnel identifier of the tunnel used when receiving the downlink data, where the two identifiers are collectively used as the paging identifier. The CP sends a correspondence between a tunnel identifier and an MMEC to the AN.

In a possible design, the paging identifier further includes a DN name corresponding to the target tunnel identifier.

To be specific, the paging identifier may include the first identifier and a DN name, the second identifier and a DN name, or the second identifier and the device identifier of the control plane network element and the DN name that are corresponding to the target tunnel identifier.

It should be noted that terminals accessing different DNs may have the same IP address. For example, UE 1 accesses a DN 1 by using an AN, and UE 2 accesses a DN 2 by using the same AN. Therefore, an IP address of the UE 1 may be the same as an IP address of the UE 2. In this scenario, the first identifier and the DN name are considered as the paging identifier; or the second identifier and the DN name are used as the paging identifier; or the second identifier and the device identifier of the control plane network element and the DN name are used as the paging identifier; or the AN determines the second identifier based on the first identifier and the DN name, and uses the second identifier as the paging identifier; or the AN determines the second identifier based on the first identifier and the DN name, and uses the second identifier and the device identifier of the control plane network element as the paging identifier, so as to uniquely determine one UE. Similarly, the DN name may be replaced with a derived value of the DN name, and the first identifier may be replaced with a derived value of the first identifier.

Further, the correspondence between a tunnel identifier and a DN name may be obtained by using the following method:

The access device receives the correspondence between a tunnel identifier and a DN name from the control plane network element in a tunnel establishment process.

The tunnel establishment process is a user plane tunnel establishment process, that is, an NG3 establishment process.

Figure 6:
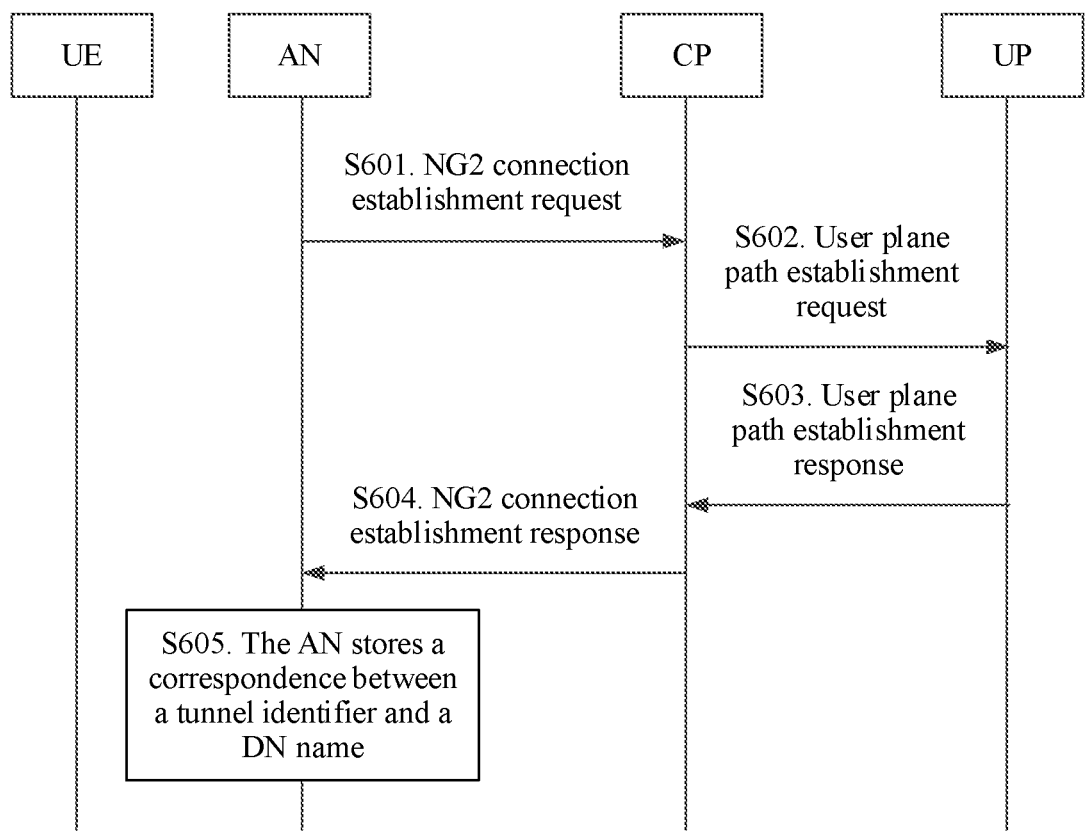
FIG. 6 is a schematic diagram of obtaining a correspondence between a tunnel identifier and a DN name in a device connection establishment process according to an embodiment of this application.
Figure 7:
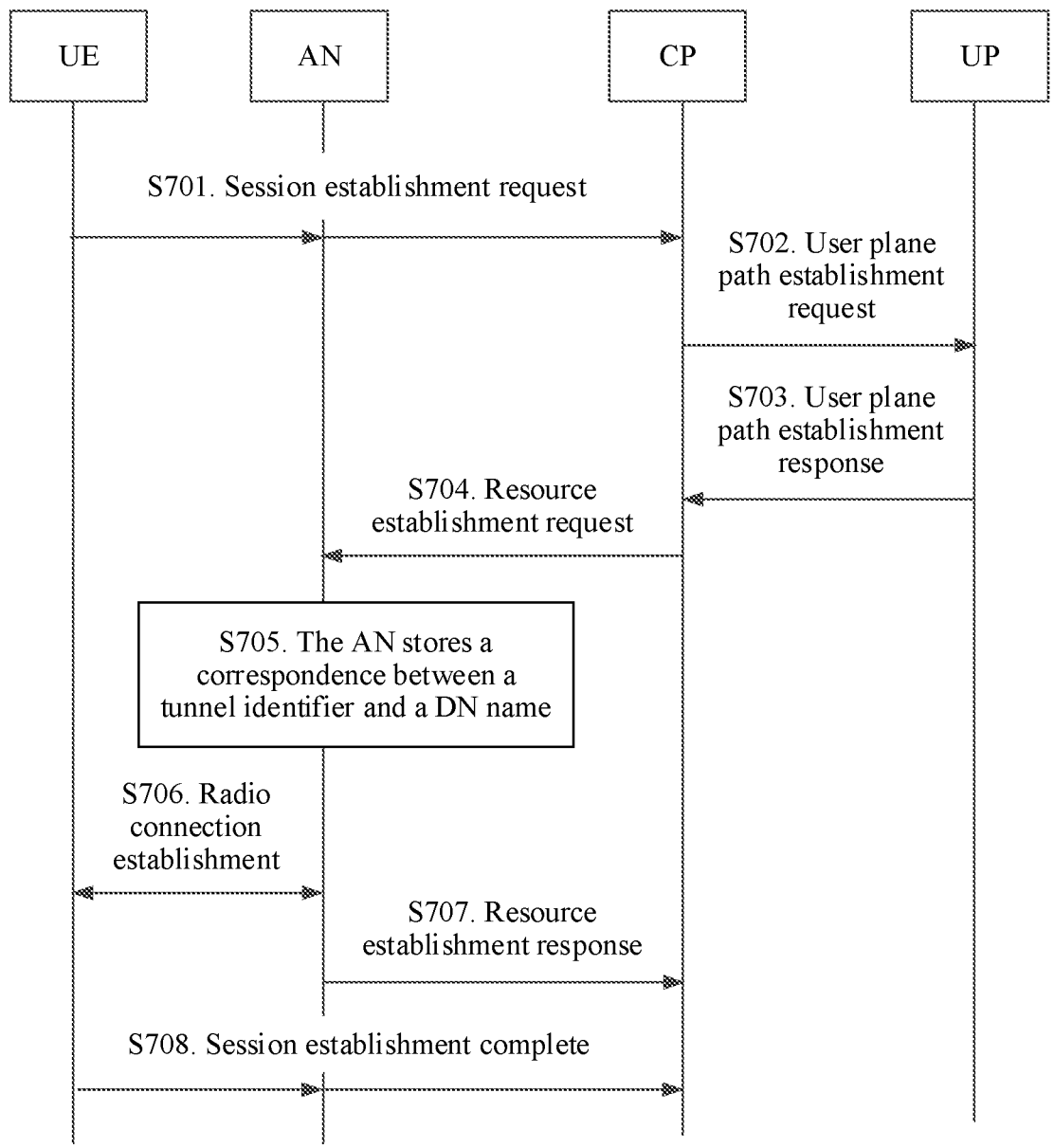
FIG. 7 is a schematic diagram of obtaining a correspondence between a tunnel identifier and a DN name in a session establishment process according to an embodiment of this application.

With reference to FIG. 6 and FIG. 7, the following describes in detail a process in which an access device obtains a correspondence between a tunnel identifier and a DN name.

It can be learned from FIG. 6 and FIG. 7 that there are two manners of establishing a user plane tunnel.

Manner 1: As shown in FIG. 6, a user plane tunnel is established in a device connection establishment process.

S601. An AN sends an NG2 connection establishment request to a CP, where the NG2 connection establishment request carries a user plane message of the AN, and the user plane message of the AN includes an AN IP address.

S602. The CP initiates, to a UP, a request for establishing a user plane path between the AN and the UP.

Specifically, the CP allocates a tunnel identifier, and sends, to the UP, the request for establishing the user plane path that carries the user plane message of the AN, the tunnel identifier, and a DN name.

In a possible implementation, the CP learns the DN name based on local configuration information; or the CP learns the corresponding DN name based on connection capability information of the UP, where the connection capability information of the UP is used to indicate a DN to which the UP is connected, and the connection capability information of the UP is stored in the CP.

S603. The UP sends a user plane path establishment response to the CP, where the user plane path establishment response carries a user plane message of the UP, and the user plane message of the UP includes a UP IP address.

S604. The CP sends an NG2 connection establishment response to the AN, where the NG2 connection establishment response carries the user plane message of the UP, the tunnel identifier, and the DN name.

S605. The AN stores a correspondence between the tunnel identifier and the DN name.

Manner 2: As shown in FIG. 7, a user plane tunnel is established in a session establishment process.

S701. UE sends a session establishment request to a CP by using an AN, to establish a session connection between the UE and the AN. Optionally, the session establishment request carries a DN name.

S702. The CP selects, based on the DN name, subscription data, and the like, a UP that provides a packet forwarding service for the UE, allocates an IP address and a tunnel identifier to the UE, and sends a user plane path establishment request to the UP, where the user plane path establishment request carries a user plane message of the AN, the tunnel identifier, the DN name, and the IP address of the UE, and the user plane message of the AN includes an AN IP address.

When the session establishment request sent by the UE carries the DN name, the CP selects, based on the DN name and a DN name in the subscription data of the UE, the UP that provides a packet forwarding service for the UE. Alternatively, when the session establishment request sent by the UE does not carry the DN name, the CP selects, based on a DN name in the subscription data of the UE, the UP that provides a packet forwarding service for the UE.

S703. The UP sends a user plane path establishment response to the CP, where the user plane path establishment response carries a user plane message of the UP, and the user plane message of the UP includes a UP IP address.

S704. The CP sends a resource establishment request to the AN.

In addition to the user plane message of the UP, and a session establishment accept message, the resource establishment request further carries the tunnel identifier, the DN name, and the IP address of the UE.

S705. The AN stores a correspondence between the tunnel identifier and the DN name.

S706. Complete establishment of a wireless connection between the AN and the UE.

S707. The AN sends a resource establishment response to the CP, to indicate that the establishment of the wireless connection between the UE and the AN is completed.

S708. The UE sends a session establishment complete message to the CP by using the AN, to indicate that the session establishment is completed.

In addition, the access device may further calculate a paging occasion based on the paging identifier, and send a paging message on the calculated paging occasion.

In the prior art, a system frame number (SFN) of a paging frame (PF) corresponding to the terminal is as follows:

$$SFN \bmod T = (T \text{ div } N)*(UE\_ID \bmod N)$$

A subframe number i_s of a paging occasion (PO) corresponding to the terminal is as follows:

$$i\_s = (UE\_ID/N) \bmod Ns$$

T is a discontinuous reception cycle of the UE (DRX cycle of the UE), that is, a paging cycle. nB is a paging configuration parameter. A value of nB may be 4T, 2T, T, T/2, T/4, T/8, T/16, or T/32. A value of N is min(T, nB) and is a quantity of paging frames in the paging cycle. A value of Ns is max(1, nB/T) and is a quantity of paging subframes in the paging frame. In the foregoing formula, the UE_ID is an international mobile subscriber identity (IMSI) mod 1024.

In this embodiment of this application, the UE_ID in the foregoing formula may be replaced with the first identifier or the second identifier, to obtain, through calculation, an SFN of a PF corresponding to the terminal and a subframe number i_s of a PO corresponding to the terminal, and send the paging message on the occasion corresponding to the SFN and the subframe number i_s. Therefore, in this embodiment of this application, the access device may calculate the paging occasion by using the paging identifier, for example, the first identifier or the second identifier, and does not need to receive, from a control plane network element, a parameter used to calculate the paging occasion, thereby saving signaling.

An embodiment of this application provides a paging method, to resolve a prior-art problem that a paging process is complex and an amount of exchanged signaling is relatively large. For a scenario in which an access device pages a terminal group, as shown in FIG. 8, there is no RRC connection and no RB between a terminal and the access device, there is no NG2 connection between a control plane network element and the access device, there is an NG4 connection between the control plane network element and a forwarding plane network element, and there is an NG3 tunnel connection (for example, the foregoing per group tunnel) between the access device and the forwarding plane network element.

Figure 8:
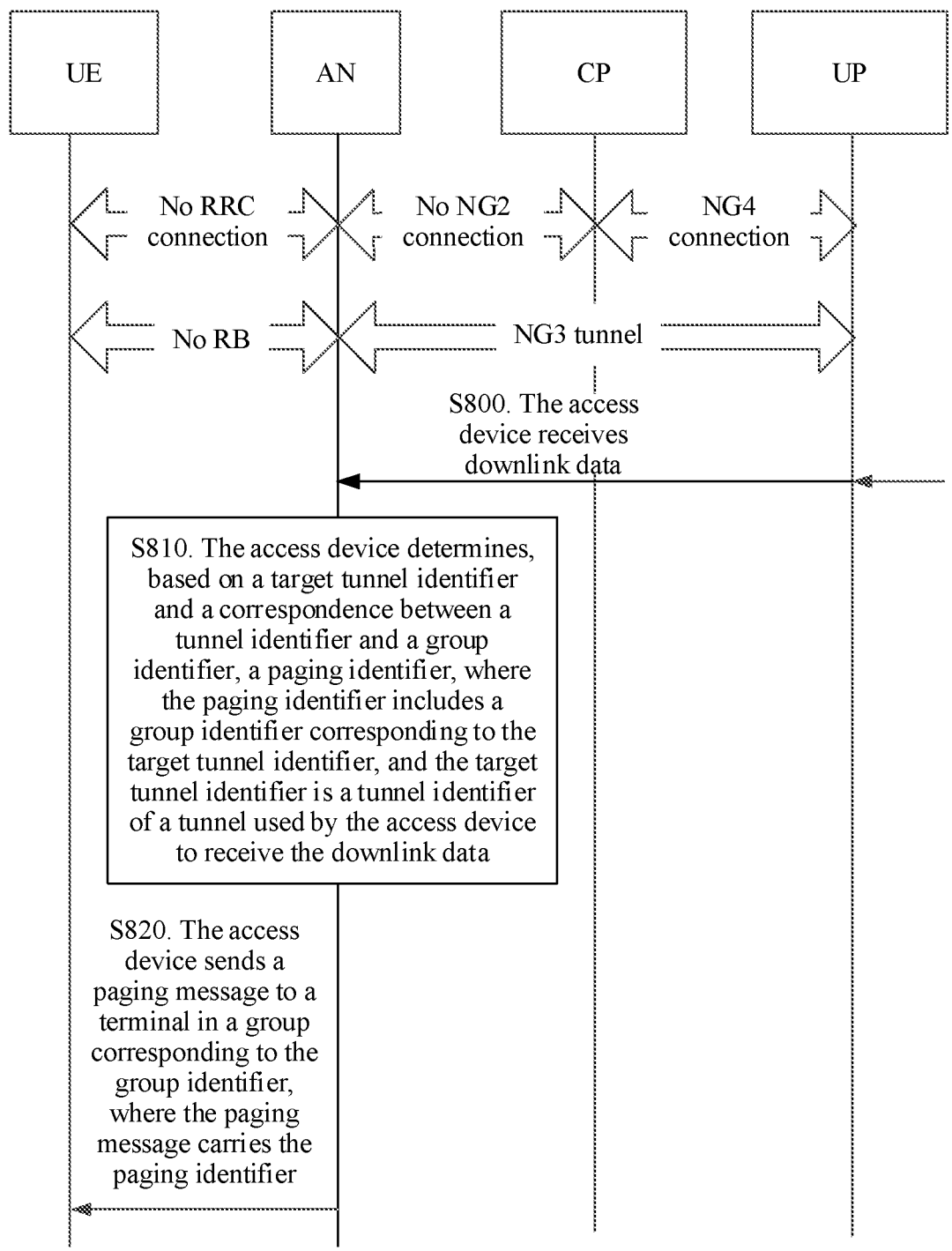
FIG. 8 is a second overview flowchart of a paging method according to an embodiment of this application.

Referring to FIG. 8, the method includes the following steps.

Step 800: The access device receives downlink data.

Step 810: The access device determines, based on a target tunnel identifier and a correspondence between a tunnel identifier and a group identifier, a paging identifier, where the paging identifier includes a group identifier corresponding to the target tunnel identifier, and the target tunnel identifier is a tunnel identifier of a tunnel used by the access device to receive the downlink data.

Step 820: The access device sends a paging message to a terminal in a group corresponding to the group identifier, where the paging message carries the paging identifier.

Therefore, according to the method provided in this embodiment of this application, the access device determines, by using the correspondence between a tunnel identifier and a group identifier, the group identifier corresponding to the target tunnel identifier, and then successfully pages the terminal included in the group, and there is no need to perform signaling interaction for a plurality of times by using a plurality of network elements, thereby improving paging efficiency. The foregoing scenario in which the access device pages the terminal group may be two possible application scenarios shown in FIG. 9 and FIG. 10.

Figure 9:
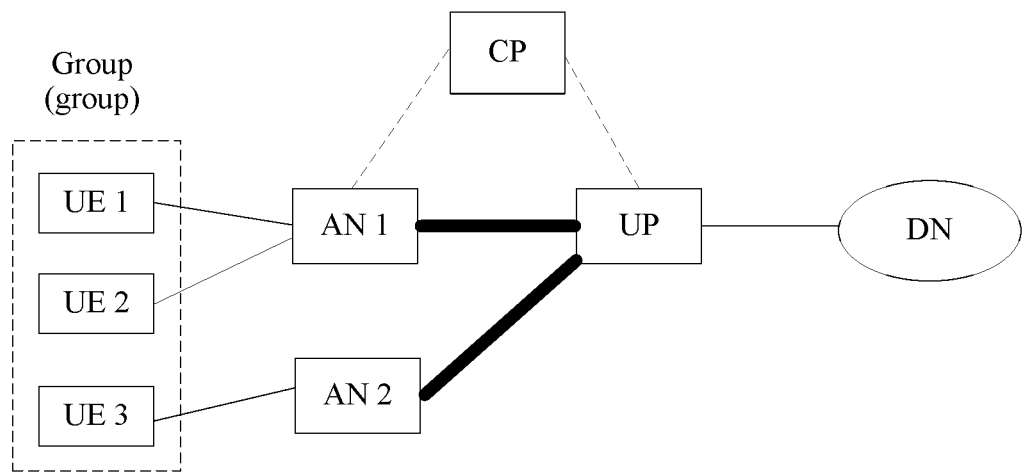
FIG. 9 is a first schematic diagram of a specific scenario in which an access device pages a terminal group according to an embodiment of this application.

In FIG. 9, UE 1, UE 2, and UE 3 belong to a group, where the UE 1 and the UE 2 access a network by using an AN 1, and the UE 3 access a network by using an AN 2. The UE 1 and UE 2 access a DN by using a group tunnel between the AN 1 and a UP, and the UE 3 access the DN by using a group tunnel between the AN 2 and the UP.

Figure 10:
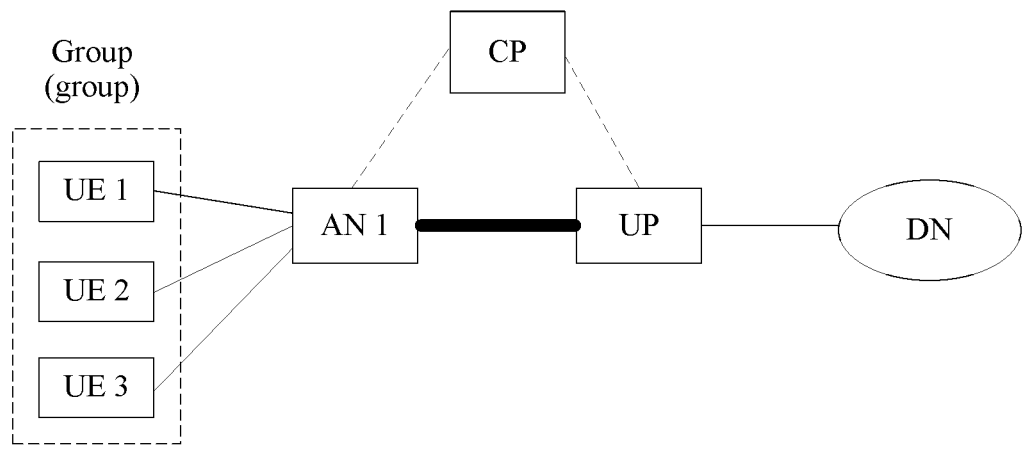
FIG. 10 is a second schematic diagram of a specific scenario in which an access device pages a terminal group according to an embodiment of this application.

In FIG. 10, UE 1, UE 2, and UE 3 belong to a group, where the UE 1, the UE 2, and the UE 3 all access a network by using an AN 1, and the UE 1, the UE 2, and the UE 3 access a DN by using a group tunnel between the AN 1 and a UP.

In a possible design, a correspondence between a tunnel identifier and a group identifier may be obtained by using the following method:

The access device receives the correspondence between a tunnel identifier and a group identifier from a control plane network element in a tunnel establishment process.

In addition, in the tunnel establishment process, the access device may further receive, from the control plane network element, a correspondence between a group identifier and a quantity of terminals included in a corresponding group.

Optionally, step 820 in which the access device sends the paging message to a terminal in a group corresponding to the group identifier may be performed by using the following method: The access device periodically sends the paging message to each terminal in the group corresponding to the group identifier until the access device determines that all terminals corresponding to the group identifier are successfully paged.

As shown in FIG. 9, the AN 1 learns, from a CP, that two terminals are included in the group corresponding to the AN 1, and the AN 2 learns, from the CP, that one terminal is included in the group corresponding to the AN 2. The AN 1 periodically sends the paging message to two terminals (the UE 1 and the UE 2) corresponding to the group identifier until the access device determines that the two terminals are successfully paged. The AN 2 periodically sends the paging message to one terminal (the UE 3) corresponding to the group identifier until the access device determines that the terminal is successfully paged.

As shown in FIG. 10, the AN 1 learns, from a CP, that a quantity of terminals included in the group corresponding to the AN 1 is 3. The AN 1 periodically sends the paging message to the three terminals (the UE 1, the UE 2, and the UE 3) corresponding to the group identifier until the access device determines that the three terminals are successfully paged.

In a possible design, the paging message further carries the downlink data.

For example, in a small packet transmission scenario, because a length of data included in downlink data is generally relatively small, the downlink data may be carried in the paging message and directly sent to the terminal.

In a possible design, after the access device sends the paging message, the access device sends the downlink data to a first terminal in the group corresponding to the group identifier when determining that the first terminal enters an active state.

In this case, the following two cases may be specifically included:

(1) When a terminal in the group enters the ACTIVE state, the access device copies the downlink data and sends the copy to the terminal. When a quantity of copies of the access device reaches the quantity of terminals in the group stored in the access device, the access device stops copying and discards the buffered downlink data.

(2) When all terminals in the group enter the ACTIVE state, the access device makes a plurality of copies of the downlink data and sends the plurality of copies to the terminals in the group at the same time, and deletes the buffered downlink data.

Figure 11:
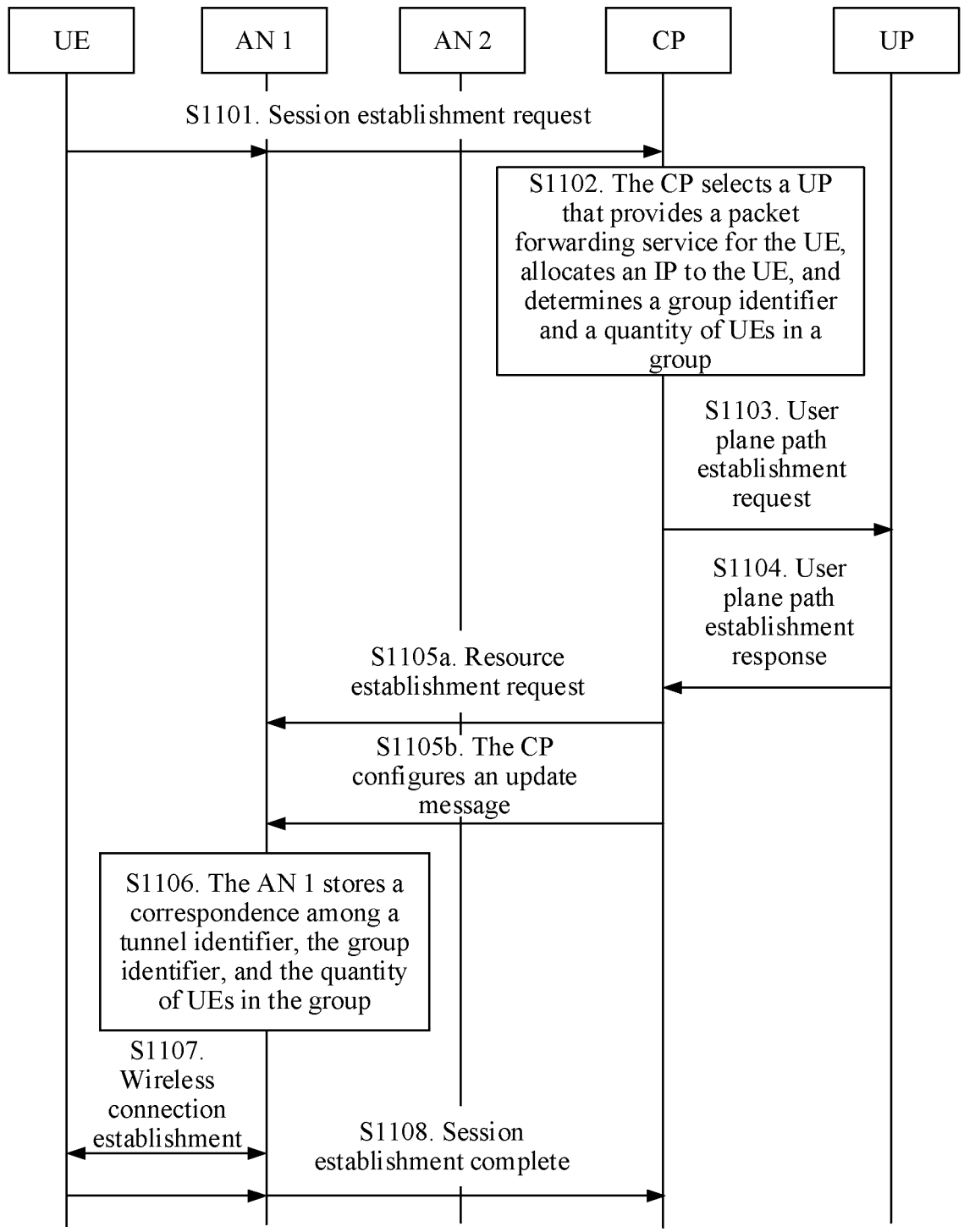
FIG. 11 is a schematic diagram of obtaining a correspondence between a tunnel identifier and a group identifier in a session establishment process according to an embodiment of this application.

As shown in FIG. 11, a process of establishing a session between UE 1 and an AN 1 is used as an example to describe how the AN 1 obtains a correspondence between a tunnel identifier and a group identifier.

S1101. The UE 1 sends a session establishment request to a CP by using the AN 1.

S1102. The CP selects a UP that provides a packet forwarding service for the UE, allocates an IP address to the UE, and determines a group identifier and a quantity of UEs in a group.

S1103. The CP allocates a tunnel identifier, and sends a user plane path establishment request to the UP, where the user plane path establishment request carries a tunnel identifier, the group identifier, and the quantity of UEs in the group.

S1104. The UP sends a user plane path establishment response message to the CP, where the user plane path establishment response message carries user plane information of the UP, and the user plane message of the UP includes a UP IP.

In addition, the UP stores a correspondence among the tunnel identifier, the group identifier, and the quantity of UEs in the group. Specifically, the UP may perform charging on the terminals in the group based on the stored correspondence among the tunnel identifier, the group identifier, and the quantity of UEs in the group. Generally, terminals belonging to the same group are charged in units of a group. When UE performs data communication with a DN by using a group tunnel, the UP determines, based on a tunnel identifier of the tunnel, that the tunnel corresponding to the tunnel identifier is a group tunnel, and performs charging, such as bill statistics collection, for the group.

S1105a. The CP sends a resource establishment request message to the AN 1, where the resource establishment request message carries the UE IP, the user plane information of the UP, and a session establishment accept message. In an implementation, the resource establishment request message further carries the group identifier, the quantity of UEs in the group, and the tunnel identifier. In another manner, the CP may further send the correspondence among the group identifier, the tunnel identifier, and the quantity of UEs in the group to the AN 1 by using a separate message (for example, a CP configuration update message shown in S1105b in the figure).

S1106. The AN 1 stores a correspondence between the tunnel identifier and the group identifier.

S1107. The AN 1 initiates wireless connection establishment between the AN 1 and the UE, to complete establishment of a radio bearer (RB) between the UE and the AN 1.

S1108. The UE sends a session establishment complete message to the CP by using the AN 1, to indicate that establishment of a session connection between the UE and the DN is completed.

It should be understood that, in the foregoing process of establishing the session between the UE 1 and the AN 1, it is assumed that there is no tunnel connection between the AN 1 and the UP. Therefore, S1102 to S1104 need to be performed. A difference between a process of establishing a session between another UE in the group and the AN 1 and the foregoing process lies in that because the CP has established a per group tunnel between the AN 1 and the UP for the UE in the group, a tunnel connection between the AN 1 and the UP does not need to be established again. Therefore, after another UE in the group sends a session establishment request to the CP by using the AN 1, the CP may directly send a resource establishment request message to the AN 1, that is, S1102 to S1104 do not need to be performed again. In this case, the resource establishment request message sent by the CP to the AN 1 carries the UE IP, the group identifier and/or the tunnel identifier, an updated quantity of UEs in the group, and the session establishment accept message.

The AN 1 updates the quantity of UEs in the group based on the group identifier and/or the tunnel identifier, and the correspondence between the tunnel identifier and the group identifier that is stored in the AN 1. It should be noted that when the CP needs to update the group identifier or the tunnel identifier, the CP adds an updated group identifier or an updated tunnel identifier, and the quantity of UEs in the group in step S1105a or S1105b.

Optionally, manners in which the CP determines the quantity of UEs in the group may include but are not limited to the following manners:

(1) The CP determines the quantity of UEs in the group based on subscription data. For example, the CP sends a subscription information obtaining request to a subscription database, and the subscription database returns a reply message to the CP. The reply message sent by the subscription database to the CP carries subscription data such as an identifier of a group to which the UE 1 belongs and a quantity of UEs in the group.

(2) The CP determines the quantity of UEs in the group according to a local configuration policy. For example, the local configuration policy is that UEs accessing a specific DN network are a group, and a corresponding group identifier is group ID 1. When both the UE 1 and UE 2 access the DN, it may be learned, according to the local configuration policy, that the UE 1 and the UE 2 belong to the same group. When the local policy does not specify the group identifier, the CP may allocate the group identifier. Therefore, the quantity of UEs in the group dynamically changes with a quantity of UEs accessing the DN.

(3) The CP determines the quantity of UEs in the group based on a service feature of the UE, for example, a QoS requirement of the UE, a mobility pattern, and the like. The mobility pattern is a mobility feature of the UE, such as no mobility (static terminal), low mobility (the UE can move in a specific geographical area), and high mobility (the UE can move freely). For example, the CP divides UEs of different mobility patterns into different groups, and counts the quantity of UEs in a group corresponding to each mobility pattern. When the UE sends the session establishment request to the CP in S1101, the session establishment request carries the mobility pattern of the UE. The CP determines, based on the mobility pattern of the UE, a group to which the UE belongs, and updates the quantity of UEs in the group.

(4) The CP may further obtain information about the group identifier and the quantity of UEs in the group by using a server. In addition, the information may be further used to trigger the CP to establish a new session connection for the group, and send the group identifier, the quantity of UEs in the group, and the tunnel identifier to the AN 1 in a process of establishing the session connection.

Based on a similar concept, this application further provides a paging apparatus. The apparatus may be configured to perform the steps performed by the access device AN in FIG. 4. Therefore, for an implementation of the paging apparatus provided in the embodiments of this application, refer to the implementation of the method.

Figure 12:
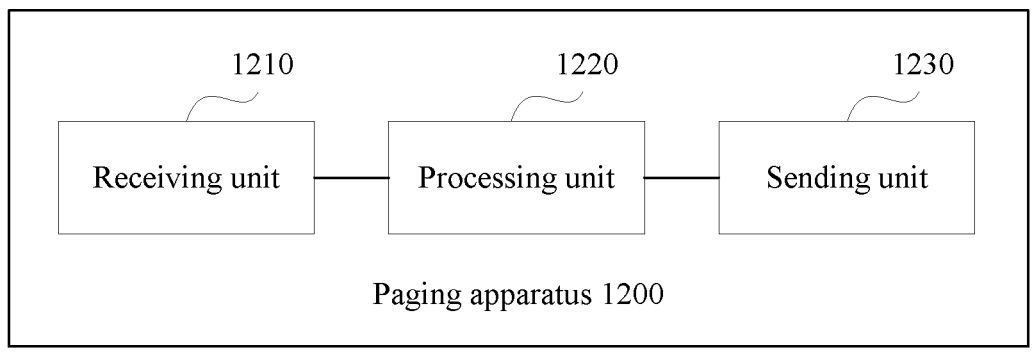
FIG. 12 is a first schematic structural diagram of a paging apparatus according to an embodiment of this application.

For example, referring to FIG. 12, an embodiment of this application provides a paging apparatus 1200, including:

a receiving unit 1210, configured to receive downlink data, where the downlink data includes a first identifier of a terminal;

a processing unit 1220, configured to determine a paging identifier based on the first identifier; and a sending unit 1230, configured to send a paging message to the terminal, where the paging message carries the paging identifier.

In a possible design, when determining the paging identifier based on the first identifier, the processing unit 1220 can be configured to:

determine the first identifier as the paging identifier.

In a possible design, when determining the paging identifier based on the first identifier, the processing unit 1220 can be configured to:

determine a second identifier of the terminal based on the first identifier, where the paging identifier includes the second identifier of the terminal.

In a possible design, the processing unit 1220 is further configured to:

determine, based on a target tunnel identifier and a correspondence between a tunnel identifier and a device identifier of a control plane network element, a device identifier that is of a control plane network element and that corresponds to the target tunnel identifier, where the target tunnel identifier is a tunnel identifier of a tunnel used by the apparatus to receive the downlink data, where the paging identifier further includes the device identifier that is of the control plane network element and that corresponds to the target tunnel identifier.

In a possible design, when determining the second identifier of the terminal based on the first identifier, the processing unit 1220 is configured to: determine, based on the target tunnel identifier and a correspondence between a tunnel identifier and a data network DN name, a DN name corresponding to the target tunnel identifier, where the target tunnel identifier is a tunnel identifier of a tunnel used by the apparatus to receive the downlink data; and determine the second identifier of the terminal based on the first identifier and the DN name corresponding to the target tunnel identifier.

In a possible design, the first identifier is an identity (ID) of the terminal, or a derived value of an ID of the terminal, or an IP address of the terminal, or a derived value of an IP address of the terminal, or a media access control MAC address of the terminal, or a derived value of a MAC address of the terminal.

In a possible design, the processing unit 1220 is further configured to:

determine, based on the target tunnel identifier and a correspondence between a tunnel identifier and a data network DN name, a DN name corresponding to the target tunnel identifier, where the target tunnel identifier is a tunnel identifier of a tunnel used by the access device to receive the downlink data, where the paging identifier further includes the DN name corresponding to the target tunnel identifier.

In a possible design, the receiving unit 1210 is further configured to:

receive the correspondence between a tunnel identifier and a DN name from the control plane network element in a tunnel establishment process.

In a possible design, when the paging message is being sent, the processing unit 1220 can be configured to calculate a paging occasion based on the paging identifier; and the sending unit 1230 can be configured to send the paging message on the paging occasion.

Based on a similar concept, this application further provides a paging apparatus. The apparatus may be configured to perform the steps performed by the access device AN in FIG. 8. Therefore, for an implementation of the paging apparatus provided in the embodiments of this application, refer to the implementation of the method. Repeated parts are not described again.

Figure 13:
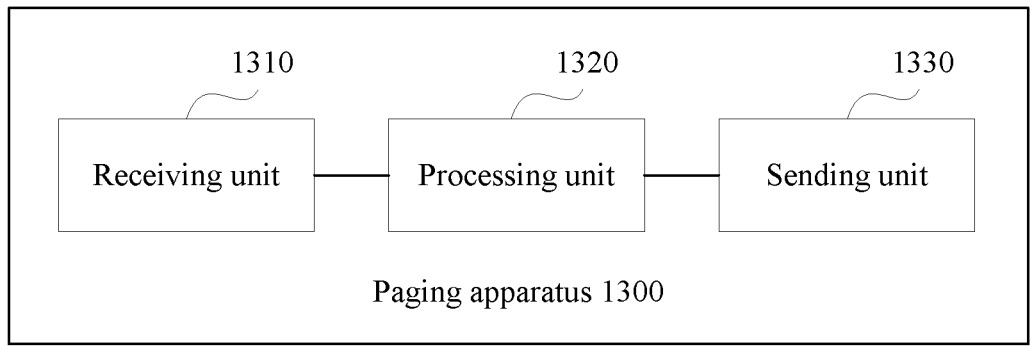
FIG. 13 is a second schematic structural diagram of a paging apparatus according to an embodiment of this application.

Referring to FIG. 13, an embodiment of this application provides a paging apparatus 1300, including:

a receiving unit 1310, configured to receive downlink data;

a processing unit 1320, configured to determine, based on a target tunnel identifier and a correspondence between a tunnel identifier and a group identifier, a group identifier corresponding to the target tunnel identifier, where the target tunnel identifier is a tunnel identifier of a tunnel used by the access device to receive the downlink data; and a sending unit 1330, configured to send a paging message to a terminal in a group corresponding to the group identifier, where the paging message carries a paging identifier, and the paging identifier includes the group identifier corresponding to the target tunnel identifier.

In a possible design, the receiving unit 1310 is further configured to:

receive the correspondence between a tunnel identifier and a group identifier from a control plane network element in a tunnel establishment process.

In a possible design, the receiving unit 1310 is further configured to:

receive a quantity of terminals included in the group corresponding to the group identifier from the control plane network element in the tunnel establishment process, where when the sending a paging message to a terminal corresponds to the group identifier, the sending unit is configured to:

periodically send the paging message to the terminal corresponding to the group identifier until the access device determines that all terminals corresponding to the group identifier are successfully paged.

In a possible design, the paging message further carries the downlink data.

In a possible design, after the sending a paging message, the processing unit 1320 is further configured to:

send the downlink data to a first terminal in the group corresponding to the group identifier by using the sending unit, when determining that the first terminal enters an active state.

It should be understood that specific division of the foregoing units is merely used as an example, and is not construed as a limitation on this application.

Based on a similar concept, this application further provides an access device. The device may be configured to perform the steps performed by the access device AN in FIG. 4. Therefore, for an implementation of the access device provided in this embodiment of this application, refer to an implementation of the method. Repeated parts are not described again.

Figure 14:
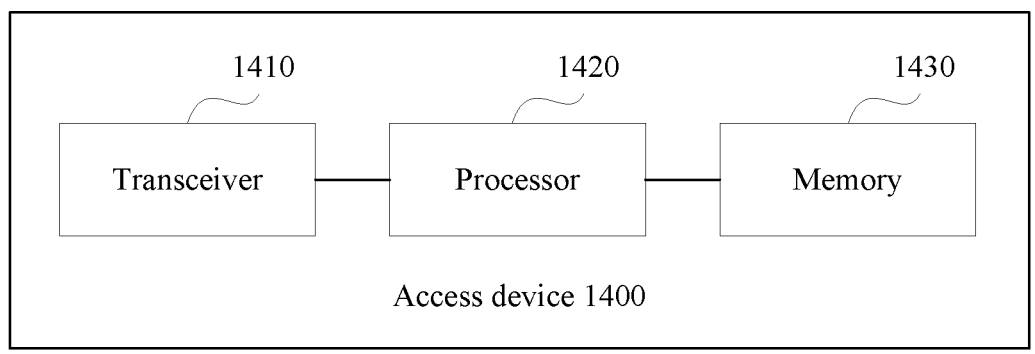
FIG. 14 is a first schematic structural diagram of an access device according to an embodiment of this application.

Referring to FIG. 14, an embodiment of this application provides an access device 1400. The device includes a transceiver 1410, a processor 1420, and a memory 1430. The transceiver 1410, the processor 1420, and the memory 1430 may be connected by using a bus system. The memory 1430 is configured to store a program, an instruction, or a code, and the processor 1420 is configured to execute the program, the instruction, or the code in the memory 1430, to specifically perform the following operations: receiving downlink data by using the transceiver 1410, where the downlink data includes a first identifier of a terminal; determining a paging identifier based on the first identifier; and sending a paging message to the terminal by using the transceiver 1410, where the paging message carries the paging identifier.

It should be noted that in a specific implementation, functions of the receiving unit 1210 and the sending unit 1230 in FIG. 12 may be implemented by using the transceiver 1410 in FIG. 14, and functions of the processing unit 1220 in FIG. 12 may be implemented by using the processor 1420 in FIG. 14.

Based on a similar concept, this application further provides an access device. The device may be configured to perform the steps performed by the access device AN in FIG. 8. Therefore, for an implementation of the access device provided in the embodiments of this application, refer to the implementation of the method. Repeated parts are not described again.

Figure 15:
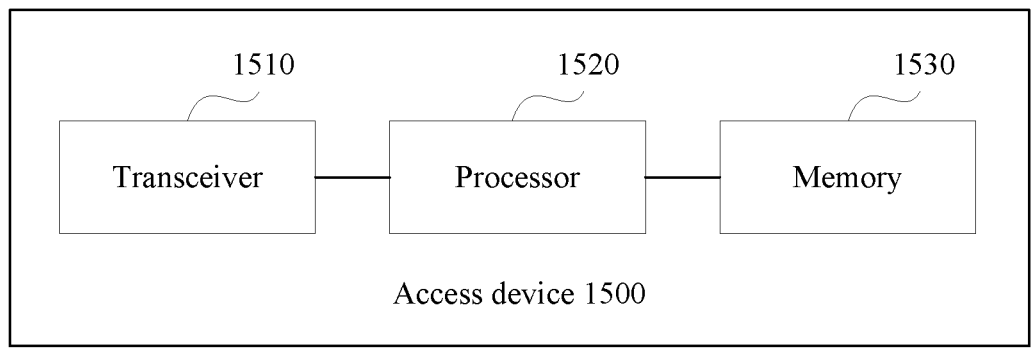
FIG. 15 is a second schematic structural diagram of an access device according to an embodiment of this application.

Referring to FIG. 15, an embodiment of this application provides an access device 1500. The device includes a transceiver 1510, a processor 1520, and a memory 1530. The transceiver 1510, the processor 1520, and the memory 1530 may be connected by using a bus system. The memory 1530 is configured to store a program, an instruction, or a code, and the processor 1520 is configured to execute the program, the instruction, or the code in the memory 1530, to perform the following operations: receiving downlink data by using the transceiver 1510; determining a paging identifier based on a target tunnel identifier and a correspondence between a tunnel identifier and a group identifier, where the paging identifier includes a group identifier corresponding to the target tunnel identifier, and the target tunnel identifier is a tunnel identifier of a tunnel used by the access device to receive the downlink data; and sending, by using the transceiver 1510, a paging message to a terminal in a group corresponding to the group identifier, where the paging message carries the paging identifier.

It should be noted that in one implementation, functions of the receiving unit 1310 and the sending unit 1330 in FIG. 13 may be implemented by using the transceiver 1510 in FIG. 15, and functions of the processing unit 1320 in FIG. 13 may be implemented by using the processor 1520 in FIG. 15.

In conclusion, the embodiments of this application provide a paging method applicable to paging a single terminal. The method includes: receiving, by an access device, downlink data, where the downlink data includes a first identifier of a terminal; determining a paging identifier based on the first identifier; and sending, by the access device, a paging message to the terminal, where the paging message carries the paging identifier. Therefore, according to the method provided in the embodiments of this application, after receiving the downlink data, the access device may determine a plurality of combination forms of the paging identifier based on the first identifier of the terminal included in the downlink data. The paging process is initiated by the access device, and there is no need to use a control plane network element device, so that signaling is saved, a signaling transmission path is shortened, and complexity of the paging process is reduced.

The embodiments of this application also provide a paging method applicable to paging a terminal group. The method includes: receiving, by an access device, downlink data; determining, based on a target tunnel identifier and a correspondence between a tunnel identifier and a group identifier, a group identifier corresponding to the target tunnel identifier, where the target tunnel identifier is a tunnel identifier of a tunnel used by the access device to receive the downlink data; and sending, by the access device, a paging message to a terminal in a group corresponding to the group identifier, where the paging message carries a paging identifier, and the paging identifier includes the group identifier corresponding to the target tunnel identifier. Therefore, according to the method provided in the embodiments of this application, the access device determines the group identifier by using the tunnel identifier of the tunnel used to receive the downlink data, and successfully pages the terminal included in the group, and there is no need to perform signaling interaction for a plurality of times by using a plurality of network elements, thereby improving paging efficiency. In addition, the paging message may further carry the downlink data, or the downlink data may be sent to the terminal when the terminal enters an active state, so that reliability of downlink data transmission is enhanced.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory, for example, non-transitory computer readable memory, which can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

Obviously, a person skilled in the art can make various modifications and variations to embodiments of this application without departing from the spirit and scope of this application. This application is intended to cover these modifications and variations provided that they fall within the scope of protection defined by the following claims and their equivalent technologies.

What is claimed is:

1. A paging method, comprising:
   receiving, by an access device, downlink data, wherein the downlink data comprises a first identifier of a terminal and the downlink data is received by the access device from a user plane (UP) tunnel that is associated with the terminal and remains connected when the terminal is idle;
   determining, by the access device, a paging identifier based on the first identifier, wherein the determining, by the access device, a paging identifier based on the first identifier comprises:
      determining, by the access device based on a target tunnel identifier and a correspondence between a tunnel identifier and a data network (DN) name, a DN name corresponding to the target tunnel identifier, wherein the target tunnel identifier is a tunnel identifier of a tunnel used by the access device to receive the downlink data; and
      determining, by the access device, a second identifier of the terminal based on the first identifier and the DN name corresponding to the target tunnel identifier, wherein the paging identifier comprises the second identifier of the terminal; and
   sending, by the access device, a paging message to the terminal, wherein the paging message carries the paging identifier.

2. The method according to claim 1, wherein the determining, by the access device, a paging identifier based on the first identifier comprises:
   using, by the access device, the first identifier as the paging identifier.

3. The method according to claim 2, further comprising:
   determining, by the access device based on a target tunnel identifier and a correspondence between a tunnel identifier and a data network DN name, a DN name corresponding to the target tunnel identifier, wherein the target tunnel identifier is a tunnel identifier of a tunnel used by the access device to receive the downlink data, wherein
   the paging identifier further comprises the DN name corresponding to the target tunnel identifier.

4. The method according to claim 1, further comprising:
   determining, by the access device based on a target tunnel identifier and a correspondence between a tunnel identifier and a device identifier of a control plane network element, a device identifier that is of a control plane network element and that corresponds to the target tunnel identifier, wherein the target tunnel identifier is a tunnel identifier of a tunnel used by the access device to receive the downlink data, and
   wherein the paging identifier further comprises the device identifier that is of the control plane network element and that corresponds to the target tunnel identifier.

5. The method according to claim 1, wherein the first identifier is an identity (ID) of the terminal, or a derived value of an ID of the terminal, or an IP address of the terminal, or a derived value of an IP address of the terminal, or a media access control MAC address of the terminal, or a derived value of a MAC address of the terminal.

6. The method according to claim 1, wherein the method further comprises: receiving, by the access device, the correspondence between a tunnel identifier and a DN name from the control plane network element in a tunnel establishment process.

7. The method according to claim 1, wherein the sending, by the access device, the paging message comprises:
   calculating, by the access device, a paging occasion based on the paging identifier; and
   sending, by the access device, the paging message on the paging occasion.

8. A paging apparatus, comprising:
   a receiver, configured to receive downlink data, wherein the downlink data comprises a first identifier of a terminal and the downlink data is received by the access device from a user plane (UP) tunnel that is associated with the terminal and remains connected when the terminal becomes idle;
   a processor, configured to determine a paging identifier based on the first identifier, wherein the determining, by the access device, a paging identifier based on the first identifier comprises:
      determining, by the access device based on a target tunnel identifier and a correspondence between a tunnel identifier and a data network (DN) name, a DN name corresponding to the target tunnel identifier, wherein the target tunnel identifier is a tunnel identifier of a tunnel used by the access device to receive the downlink data; and determining, by the access device, a second identifier of the terminal based on the first identifier and the DN name corresponding to the target tunnel identifier, wherein the paging identifier comprises the second identifier of the terminal; and a transmitter, configured to send a paging message to the terminal, wherein the paging message carries the paging identifier.

9. The apparatus according to claim 8, wherein the processor is configured to:
use the first identifier as the paging identifier.

10. The apparatus according to claim 9, wherein the processor is further configured to:
determine, based on a target tunnel identifier and a correspondence between a tunnel identifier and a data network DN name, a DN name corresponding to the target tunnel identifier, wherein the target tunnel identifier is a tunnel identifier of a tunnel used by the access device to receive the downlink data, wherein the paging identifier further comprises the DN name corresponding to the target tunnel identifier.

11. The apparatus according to claim 8, wherein the processor is configured to:
determine, based on a target tunnel identifier and a correspondence between a tunnel identifier and a data network DN name, a DN name corresponding to the target tunnel identifier, wherein the target tunnel identifier is a tunnel identifier of a tunnel used by the apparatus to receive the downlink data; and determine the second identifier of the terminal based on the first identifier and the DN name corresponding to the target tunnel identifier.

* * * * *

UNITED STATES PATENT AND TRADEMARK OFFICE
CERTIFICATE OF CORRECTION

| | | |
|---|---|---|
| PATENT NO. | : 11,184,875 B2 | Page 1 of 1 |
| APPLICATION NO. | : 16/571308 | |
| DATED | : November 23, 2021 | |
| INVENTOR(S) | : Yongcui Li et al. | |

It is certified that error appears in the above-identified patent and that said Letters Patent is hereby corrected as shown below:

In the Claims

In Column 22, Line 36, in Claim 4, delete "clement" and insert -- element --.

Signed and Sealed this
Twenty-fourth Day of May, 2022

*Katherine Kelly Vidal*

Katherine Kelly Vidal
*Director of the United States Patent and Trademark Office*